United States Patent
Pinciuc et al.

(10) Patent No.: US 11,303,155 B2
(45) Date of Patent: Apr. 12, 2022

(54) WIRELESS CHARGING SYSTEM WITH SOLENOIDS

(71) Applicant: Apple Inc., Cupertino, CA (US)

(72) Inventors: Christopher M. Pinciuc, Cupertino, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/872,243

(22) Filed: May 11, 2020

(65) Prior Publication Data

US 2020/0343768 A1    Oct. 29, 2020

Related U.S. Application Data

(63) Continuation of application No. 15/491,893, filed on Apr. 19, 2017.

(Continued)

(51) Int. Cl.
*H02J 50/10* (2016.01)
*H02J 7/00* (2006.01)
*H02J 50/90* (2016.01)
*H02J 50/40* (2016.01)
*H01F 27/24* (2006.01)

(Continued)

(52) U.S. Cl.
CPC .............. *H02J 50/10* (2016.02); *H01F 27/24* (2013.01); *H01F 27/2823* (2013.01); *H01F 38/14* (2013.01); *H02J 7/0042* (2013.01); *H02J 7/0044* (2013.01); *H02J 7/025* (2013.01); *H02J 50/40* (2016.02); *H02J 50/90* (2016.02)

(58) Field of Classification Search
None
See application file for complete search history.

(56) References Cited

U.S. PATENT DOCUMENTS 4,912,391 A * 3/1990 Meadows ............... H02J 50/10
                                                        320/108
6,721,540 B1    4/2004 Hayakawa
(Continued)

FOREIGN PATENT DOCUMENTS

JP          H104639 A      1/1998
JP          H10225020 A    8/1998
(Continued)

*Primary Examiner* — Daniel Kessie
(74) *Attorney, Agent, or Firm* — Treyz Law Group, P.C.; George Victor Treyz; Michael H. Lyons

(57) ABSTRACT

A wireless power transmitting device may transmit wireless power signals to a wireless power receiving device. The wireless power receiving device may have a housing. A display may be mounted in the housing on a front face of the device. A rear housing wall on a rear face of the device may be provided with a wireless power receiving solenoid. The solenoid may have a linear strip shape that extends along a longitudinal axis. The longitudinal axis may extend perpendicularly to a wrist strap coupled to the housing. The wireless power receiving solenoid may have opposing first and second ends. The wireless power transmitting device may have a wireless power transmitting solenoid with opposing first and second ends that are configured to transmit the wireless power signals respectively to the first and second ends of the wireless power receiving device when the wireless power receiving solenoid is within the cradle.

20 Claims, 17 Drawing Sheets

Related U.S. Application Data

(60) Provisional application No. 62/415,348, filed on Oct. 31, 2016.

(51) Int. Cl.
*H01F 27/28* (2006.01)
*H01F 38/14* (2006.01)
*H02J 7/02* (2016.01)

(56) References Cited

U.S. PATENT DOCUMENTS

| | | |
|---|---|---|
| 7,211,986 B1 | 5/2007 | Flowerdew et al. |
| 9,209,627 B2 | 12/2015 | Barrman et al. |
| 9,349,520 B2 | 5/2016 | Demetriou et al. |
| 2002/0079863 A1 | 6/2002 | Abe et al. |
| 2006/0061324 A1 | 3/2006 | Oglesbee |
| 2009/0096413 A1 | 4/2009 | Partovi et al. |
| 2010/0013322 A1 | 1/2010 | Sogabe et al. |
| 2011/0133726 A1 | 6/2011 | Ballantyne et al. |
| 2012/0086619 A1* | 4/2012 | Nakamura ............... H01Q 7/06 343/788 |
| 2013/0093386 A1 | 4/2013 | Tsai et al. |
| 2013/0307468 A1 | 11/2013 | Lee et al. |
| 2014/0306654 A1 | 10/2014 | Partovi |
| 2015/0162767 A1 | 6/2015 | Oh et al. |
| 2015/0270046 A1 | 9/2015 | Golko et al. |
| 2015/0280483 A1* | 10/2015 | Golko ..................... H02J 50/90 320/108 |
| 2015/0348697 A1 | 12/2015 | Graham et al. |
| 2015/0364938 A1 | 12/2015 | Lapetina et al. |
| 2015/0371768 A1 | 12/2015 | Graham et al. |
| 2016/0064137 A1 | 3/2016 | Perez et al. |
| 2016/0301241 A1 | 10/2016 | Cho et al. |
| 2017/0018947 A1 | 1/2017 | Chien et al. |
| 2017/0178803 A1 | 6/2017 | Kim et al. |

FOREIGN PATENT DOCUMENTS

| | | |
|---|---|---|
| JP | 2001110658 A | 4/2001 |
| JP | 2004194400 A | 7/2004 |
| JP | 2005137173 A | 5/2005 |
| JP | 2007149946 A | 6/2007 |
| JP | 2007301177 A | 11/2007 |
| JP | S50062073 A | 1/2010 |
| JP | 2011114911 A | 6/2011 |
| JP | 2011160501 A | 8/2011 |
| JP | 201299644 A | 5/2012 |
| JP | 2013258897 A | 12/2013 |
| JP | 201411332 A | 1/2014 |
| JP | 2014150628 A | 8/2014 |
| JP | 2014175865 A | 9/2014 |
| JP | 2014179438 A | 9/2014 |
| JP | 2015065720 A | 4/2015 |
| JP | 2015099847 A | 5/2015 |
| JP | 2016178723 A | 10/2016 |
| KR | 20130063635 A | 6/2013 |
| KR | 1020160086685 A | 7/2016 |
| WO | 2003096361 A1 | 11/2003 |
| WO | 2014119297 A1 | 8/2014 |
| WO | 2016048047 A1 | 3/2016 |

\* cited by examiner

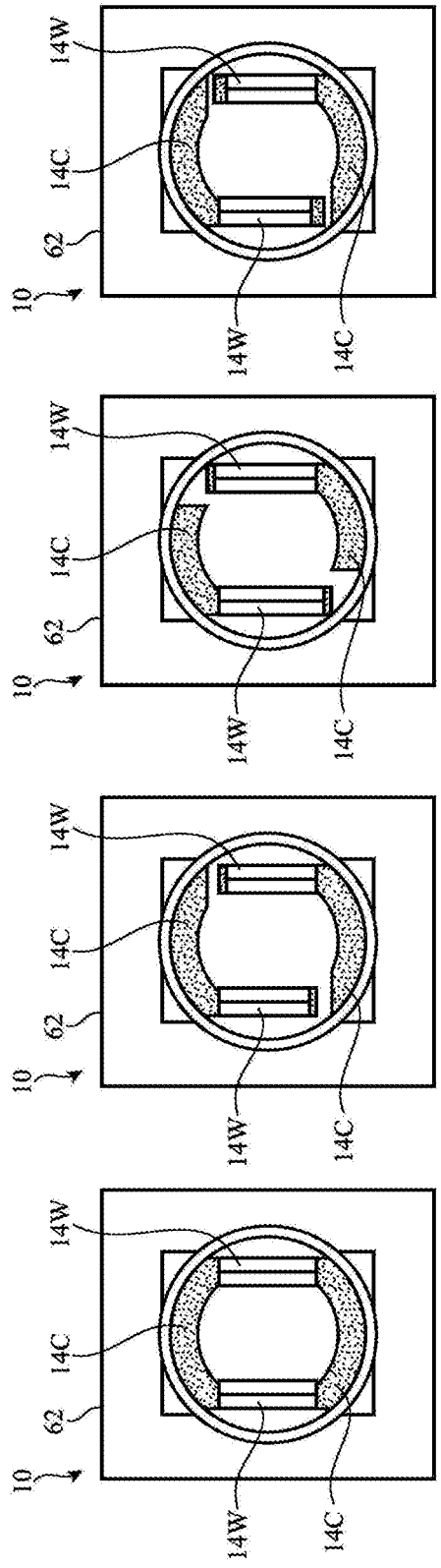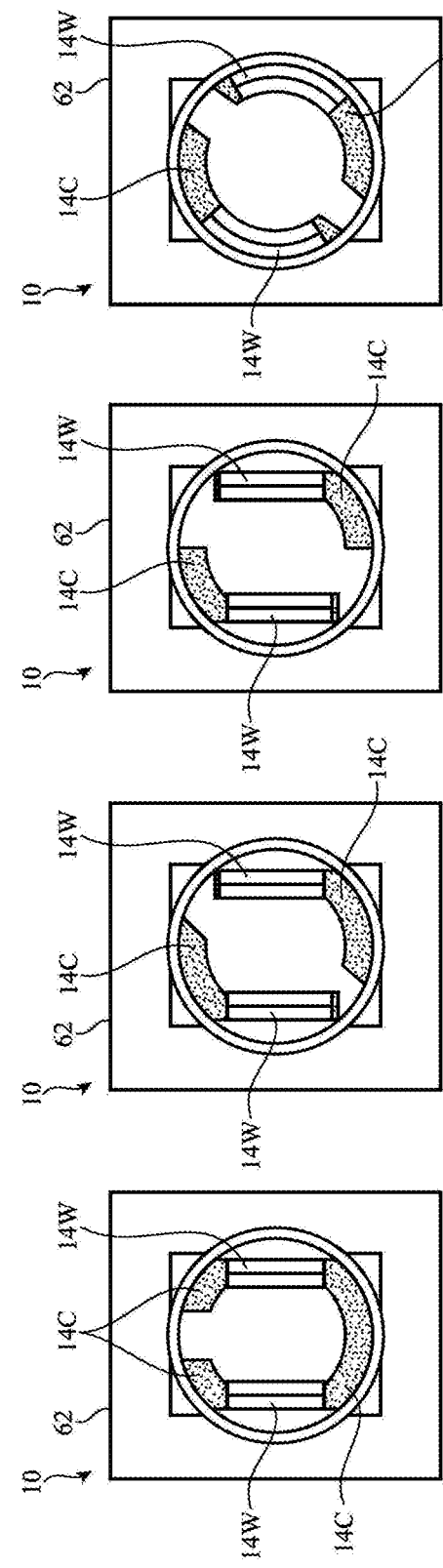

WIRELESS CHARGING SYSTEM WITH SOLENOIDS

This application is a continuation of U.S. patent application Ser. No. 15/491,893, filed Apr. 19, 2017, which claims the benefit of provisional patent application No. 62/415,348, filed Oct. 31, 2016, each of which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface or magnetic charging cable may wirelessly transmit power to a portable electronic device. The portable electronic device may receive the wirelessly transmitted power and may use this power to charge an internal battery or to power the device. In some situations, it may be challenging to achieve desired levels of charging efficiency due to the way in which the portable electronic device and wireless power transmitting device are oriented with respect to each other and the configurations used for the wireless charging components in these devices.

SUMMARY

A wireless power transmitting device such as a device with a wireless charging surface or a device with a cradle or other support structure can transmit power wirelessly to a wireless power receiving device. The wireless power receiving device may have a housing such as a metal housing. A display may be mounted in the metal housing on a front face of the device. A rear housing wall on a rear face of the device may be provided with a wireless power receiving solenoid.

The wireless power receiving solenoid may have a core formed from a magnetic material such as a ferrite strip that is wrapped with a wire. The wire may be formed from a solid metal wire with a dielectric coating, a solid metal wire with a magnetic coating layer, a metal wire having a rectangular cross-sectional shape, or a wire formed form intertwined metal filaments.

The solenoid may have a linear strip shape that extends along a longitudinal axis. The wireless power receiving device may have a strap coupled to sidewalls of the metal housing. The longitudinal axis may extend in a direction that is perpendicular to the strap and parallel to the sidewalls to which the strap is coupled.

The wireless power receiving solenoid may have opposing first and second ends. In some arrangements, the wireless power transmitting device may have a wireless power transmitting solenoid with opposing first and second ends that are configured to transmit wireless power signals respectively to the first and second ends of the wireless power receiving solenoid when the wireless power receiving solenoid has been received within a cradle. The wireless power receiving device may also use the wireless power receiving solenoid to receive power from a wireless charging mat or other wireless power transmitting device that emits wireless power signals from a wireless charging surface.

BRIEF DESCRIPTION OF THE DRAWINGS

FIGS. 23-32 are rear views of illustrative watches with wireless charging solenoids in illustrative configurations in accordance with an embodiment.

DETAILED DESCRIPTION

A wireless power system may have a wireless power transmitting device such as a wireless charging mat, wireless charging puck, wireless charging stand, wireless charging table, or other wireless power transmitting equipment. The wireless power transmitting device may have one or more coils that are used in transmitting wireless power to a wireless power receiving device. In some configurations, the coils may be implemented using elongated solenoids. A wireless power transmitting solenoid may be used, for example, in wireless power transmitting equipment with a magnetic charging cable, stand, or other equipment that contains a support structure such as a cradle. In other configurations, arrays of planar coils may be used in forming a wireless charging surface for a wireless power transmitting device. The wireless power receiving device may be a cellular telephone, watch, media player, tablet computer, earbuds, remote control, laptop computer, or other portable electronic device. The wireless power receiving device may have a wireless power receiving solenoid that receives wireless power signals transmitted by the wireless power transmitting device.

During operation, the wireless power transmitting device may supply alternating-current signals to one or more wireless power transmitting coils. This causes the coils to transmit alternating-current electromagnetic signals (sometimes referred to as wireless power signals) to the wireless power receiving device. The wireless power receiving device may have one or more coils such as an elongated wireless power receiving solenoid for receiving the transmitted wireless power signals.

With one illustrative configuration, the wireless power receiving device may have an elongated coil with wire wrapped around a magnetic core that forms a solenoid. Configurations in which the wireless power transmitting device has a wireless charging surface with an array of coils or a cradle or other structure with a wireless power transmitting solenoid that supplies wireless power to a wireless power receiving solenoid in a wireless power receiving device such as a watch may sometimes be described herein as an example. This is, however, merely illustrative. Any suitable configuration may be used for the wireless power transmitting device and any suitable configuration for the wireless power receiving device may be used, if desired.

Figure 1:
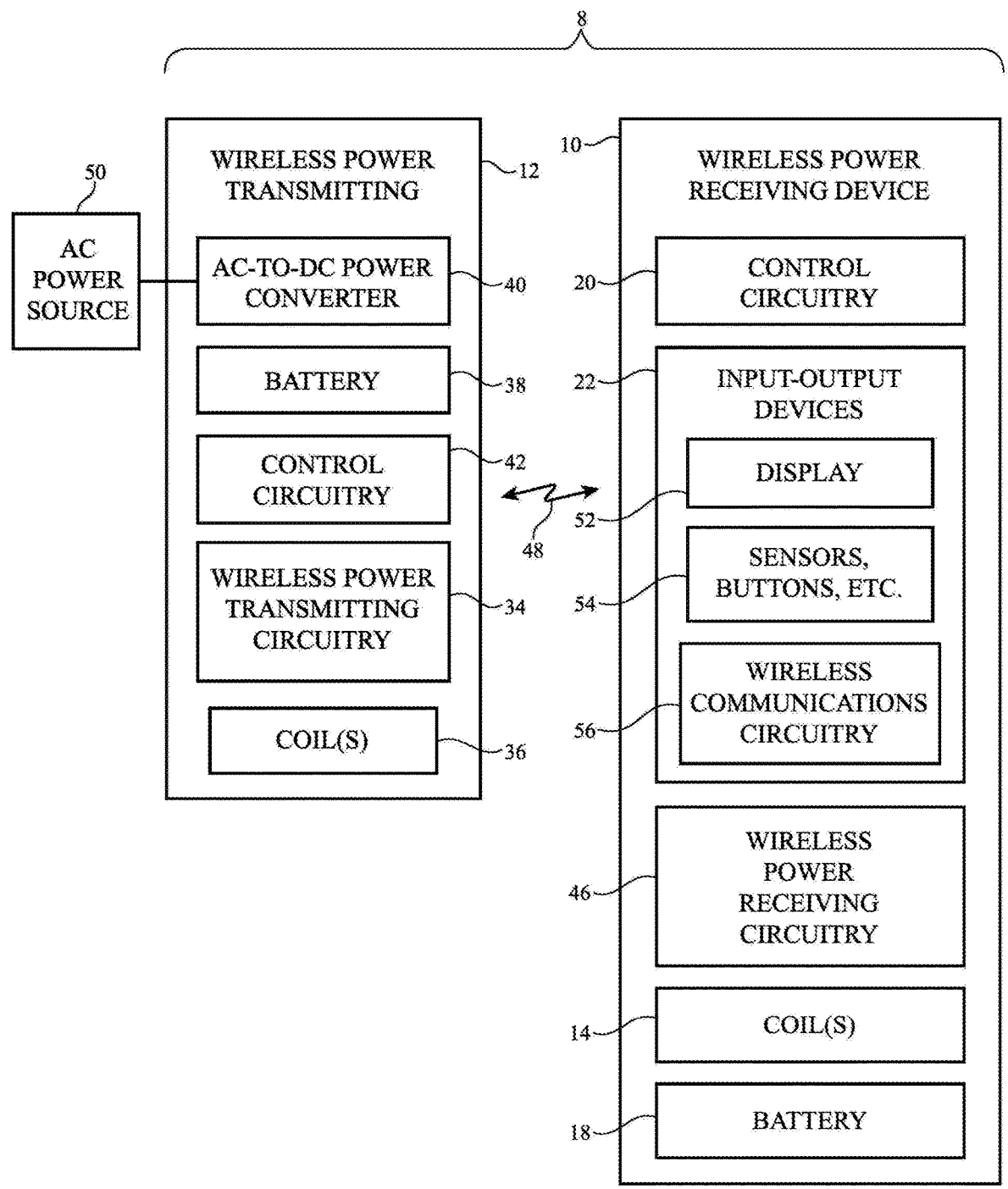
FIG. 1 is a schematic diagram of an illustrative wireless charging system in accordance with some embodiments.

An illustrative wireless power system (wireless charging system) is shown in FIG. 1. As shown in FIG. 1, wireless power system 8 may include a wireless power transmitting device such as wireless power transmitting device 12 and may include one or more wireless power receiving devices 10.

Power transmitting device 12 may be a stand-alone power adapter or equipment that is coupled to power adapter circuitry using a cable. Device 12 may be a wireless charging mat with an array of coils mounted under a planar dielectric layer that serves as a wireless charging surface, a device with a charging cable (e.g., a magnetic charging cable having a puck with a wireless power transmitting coil and magnets for coupling the puck to a wireless power receiving device), a stand (e.g., a dock), a table with an array of coils, or other device that includes power adapter circuitry, may include a wireless charging cradle or other wireless power transfer component that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging device with a wireless charging surface or a wireless charging cradle of the type that may be incorporated into a puck on a cable or a cradle in a dock or other stand may sometimes be described herein as examples.

Each power receiving device 10 in system 8 may be a portable electronic device such as a wristwatch, a cellular telephone, a laptop computer, a tablet computer, or other electronic equipment. Power transmitting device 12 may be coupled to a source of alternating current voltage such as alternating current power source 50 (e.g., a wall outlet that supplies line power or other source of mains electricity), may have a battery such as battery 38 for supplying power, and/or may have another source of power. Power transmitting device 12 may have a power converter such as AC-DC power converter 40 for converting power from a mains power source or other power source into DC power that is used to power control circuitry 42 and other circuitry in device 12.

During operation, a controller in control circuitry 42 may use wireless power transmitting circuitry 34 and one or more coil(s) 36 coupled to circuitry 34 to transmit alternating current electromagnetic signals 48 to device 10 and thereby convey wireless power to power receiving circuitry 46 of device 10. Power transmitting circuitry 34 may have switching circuitry (e.g., transistors) that are turned on and off based on control signals provided by control circuitry 42 to create AC current signals through coil(s) 36. As the AC currents pass through coil(s) 36, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 may convert received AC signals (received alternating-current currents and voltages associated with wireless power signals) from coil(s) 14 into DC voltage signals for powering device 10. The DC voltages may be used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of transmitter 12 and/or other equipment, audio components, and other components (e.g., input-output devices 22 and/or control circuitry 20) and may be used in charging an internal battery in device 10 such as battery 18.

Devices 12 and 10 may include control circuitry 42 and 20. Control circuitry 42 and 20 may include storage and may include processing circuitry such as microprocessors, power management units, baseband processors, digital signal processors, microcontrollers, and/or application-specific integrated circuits with processing circuits. Control circuitry 42 and 20 may be configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly using in-band or out-of-band communications. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas, using coils 36 and 14, etc.).

Figure 2:
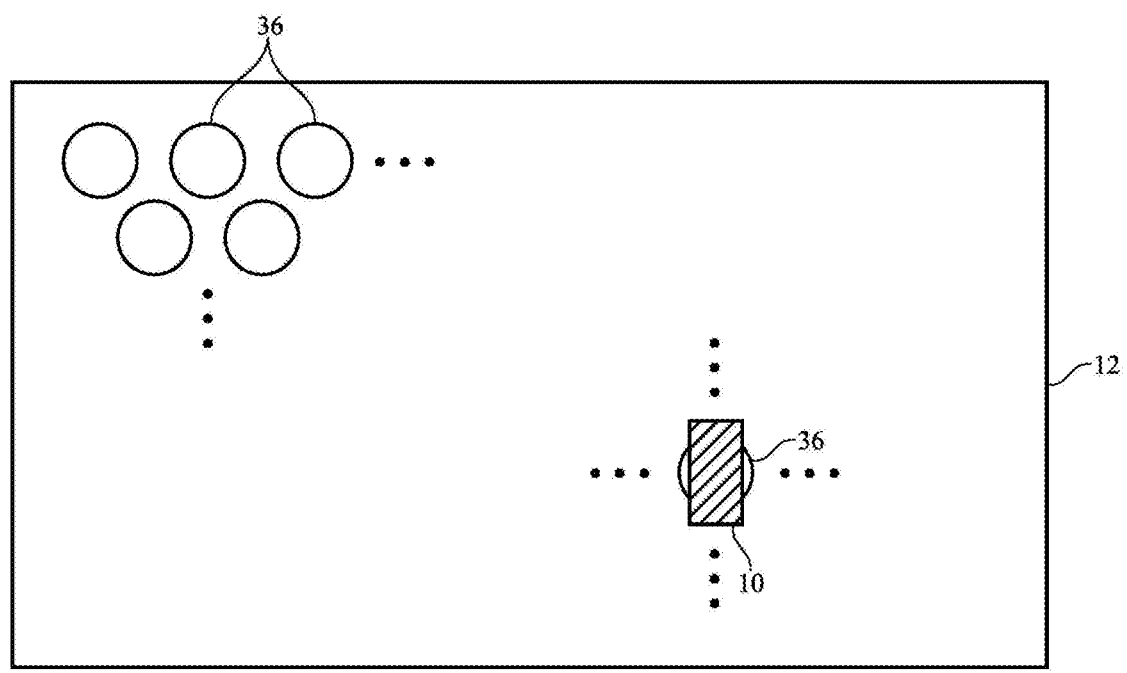
FIG. 2 is a top view of an illustrative wireless charging system having a wireless power transmitting device that forms a wireless charging surface in accordance with an embodiment.
Figure 3:
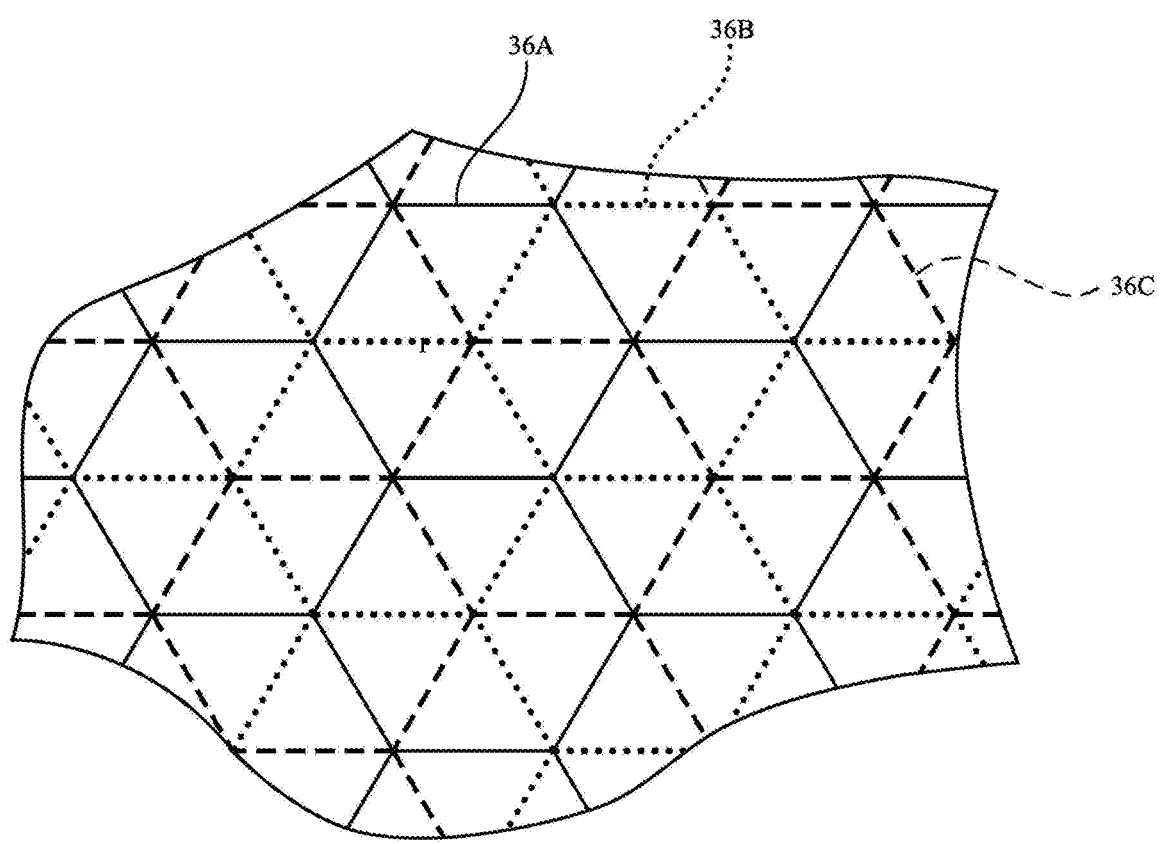
FIG. 3 is a diagram of an illustrative array of wireless power transmitting coils for a wireless charging surface in accordance with an embodiment.

With one illustrative configuration, wireless transmitting device 12 is a wireless charging mat or other wireless power transmitting equipment that has an array of coils that supply wireless power over a wireless charging surface. This type of arrangement is shown in FIG. 2. As shown in FIG. 2, wireless power receiving device 10 may be located over one or more of coils 36 during charging. Coils 36 may be arranged across a charging surface with any suitable tiling pattern (rectangular, hexagonal, etc.). As an example, a coil array may have rows and columns of coils 36 each of which is placed in a non-overlapping rectangular tile location, a coil array may have rectangularly tiled rows and columns of coils 36 in two or more staggered arrays, may have coils 36 in a hexagonally tiled array pattern such as a pattern in which each hexagonal tile includes a respective non-overlapping coil 36, or may be arranged in a set of two or more or three or more overlapping hexagonally tiled sets of coils. An illustrative coil array configuration based on three staggered sets (arrays) of hexagonally tiled coils 36 is shown in FIG. 3. The illustrative coil array of FIG. 3, device 12 may be associated with a charging mat or other device with a charging surface and may have a first layer of hexagonally tiled coils 36A, a second layer of hexagonally tiled coils 36B, and a third layer of hexagonally tiled coils 36C. During operation, control circuitry 42 of device 10 may direct circuitry 34 to route alternating current signals to a desired coil or coils in a desired one of these three overlapping and staggered layers to optimize overlap between the transmitting coil that is in use by device 12 and the receiving coil(s) 14 in device 10.

Figure 4:
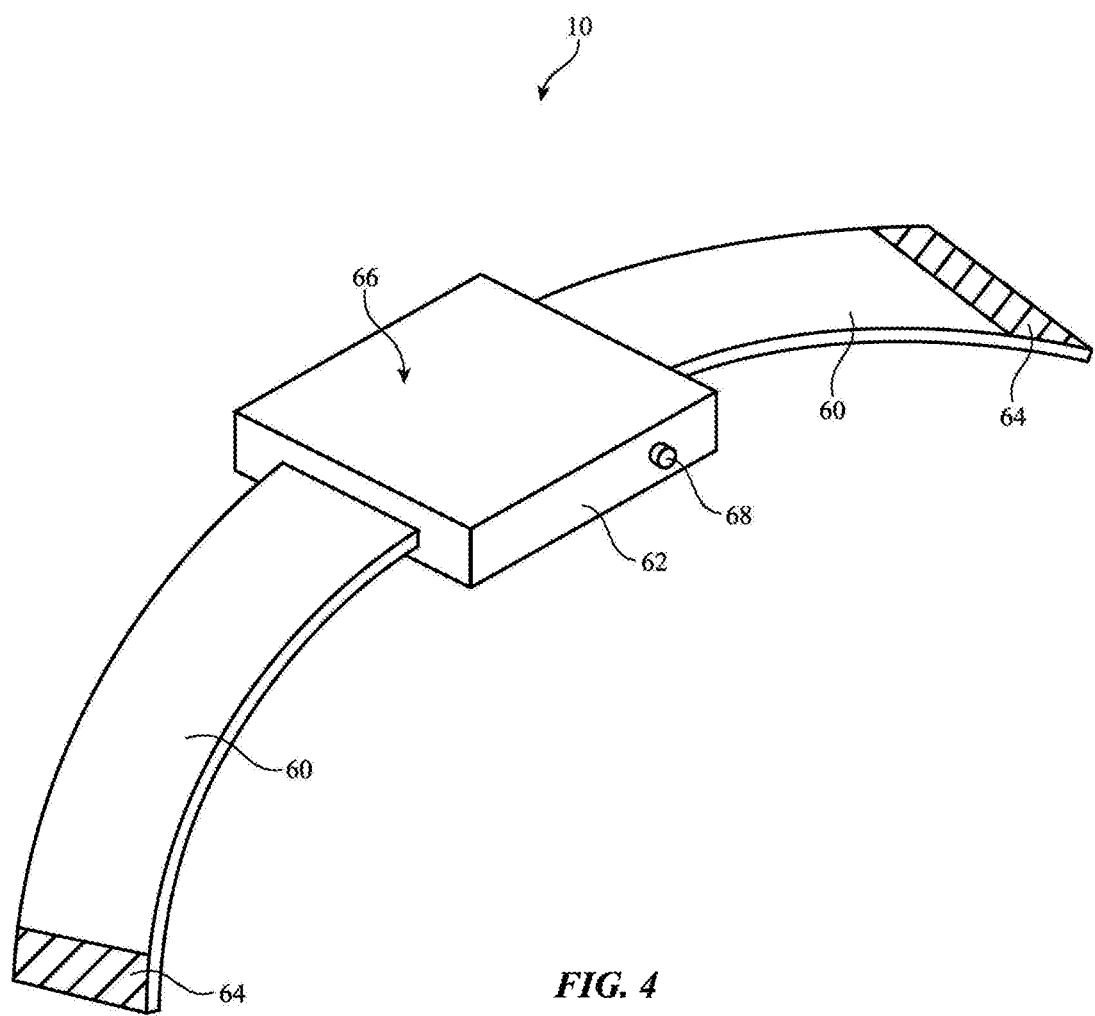
FIG. 4 is a perspective view of an illustrative portable electronic device such as a wristwatch that may be wirelessly charged in accordance with an embodiment.

FIG. 4 is a perspective view of power receiving device 10 in an illustrative configuration in which power receiving device 10 is a wristwatch device. In this example, device (watch) 10 has a strap such as strap 60 that is coupled to left and right sidewalls of watch housing 62. Strap 60 may be coupled to housing 62 using a spring-loaded pin, using a clip, using screws or other fasteners, by routing portions of strap 60 through a slot or other opening in housing 62, using adhesive, by forming strap and housing 62 as portions of a common structure, using other coupling techniques, or using a combination of these techniques. Strap 60 may have a clasp such as clasp 64 that allows strap 60 to be secured around a user's wrist. Elastic straps without clasps and straps with other fastening mechanisms may also be used, if desired.

Housing 62 may be formed from one or more materials such as metal (aluminum, stainless steel, gold, etc.), glass, carbon-fiber composites and other fiber-composite materials, polymer (plastic), ceramic, other materials, and/or combinations of these material. Housing 62 may have a square outline or other rectangular outline (footprint when viewed from above) or may have a circular outline, oval outline, etc. Display 66 may be mounted on a front face of housing 62 and buttons (e.g., a watch crown, etc.) such as button 68 may be mounted on sidewalls or other portions of housing 62. An opposing rear face of housing 62 may be formed from a metal rear housing wall structure or other suitable housing wall structure and may be provided with windows to accommodate light emission and/or light detection and/or may be provided with a solenoid (coil) 14 to receive wireless power from device 12.

Figure 5:
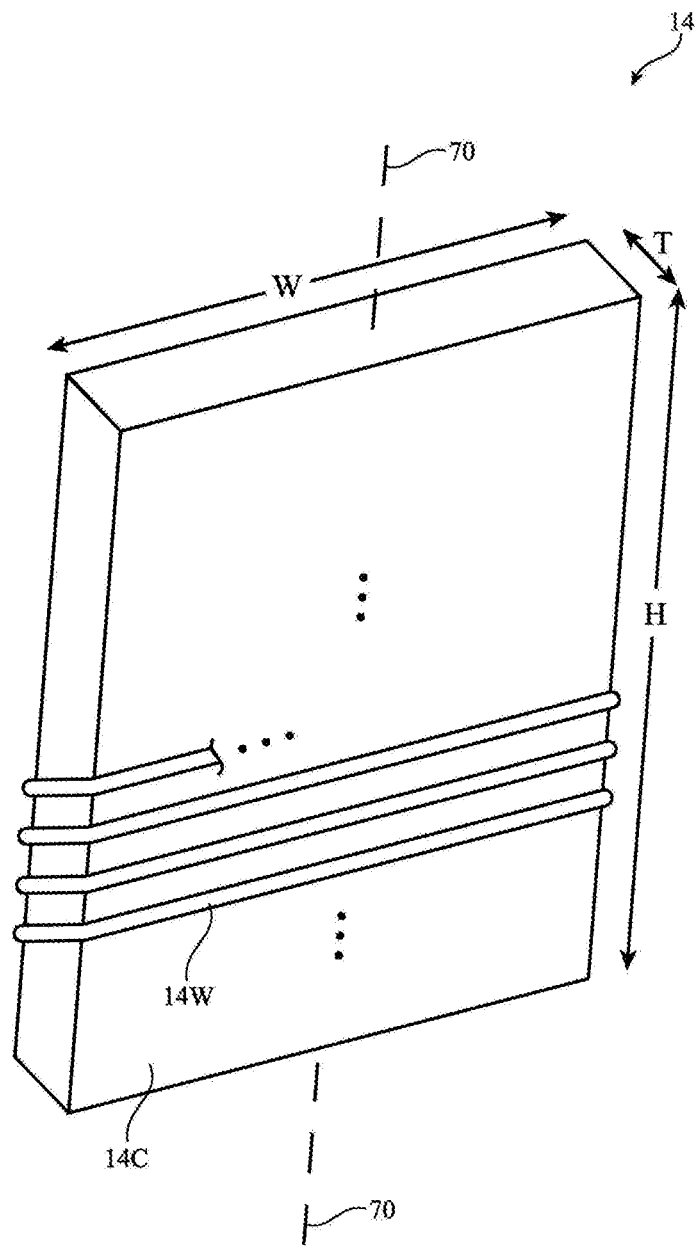
FIG. 5 is a perspective view of an illustrative wireless power receiving solenoid that may be used in a wireless power receiving device in accordance with an embodiment.

A solenoid on the rear face of housing 62 of device 10 may have a linear configuration of the type shown by illustrative solenoid 14 of FIG. 5. Solenoid 14 of FIG. 5 has an elongated linear core such as strip-shaped solenoid core 14C wrapped with multiple turns of wire 14W. Core 14C may be formed from a magnetic material having a relatively high relative permeability. For example, in configurations in which wireless power transmitting circuitry 34 and wireless power receiving circuitry 46 operate at alternating current frequencies of about 300-400 kHz, the relative permeability of core 14C may be 1000-5000 at 300-400 kHz, at least 1000 at 300-400 kHz, 2000-6000 at 300-400 kHz, or less than 6000 at 300-400 kHz. If desired, the relative permeability of core 14C may be lower or higher. As an example, if circuitry 34 and 46 is configured to operate at a higher frequency (e.g., 6 MHz), the relative permeability of core 14C may be 100 at 6 MHz. Core 14C may be formed from a ferrite (e.g., a magnesium zinc ferrite) or other suitable magnetic material. Core 14W may be elongated along longitudinal axis 70. Length L of solenoid 14 may be 2.4 cm, 1-10 cm, 1-5 cm, 2-5 cm, 1-3 cm, more than 0.5 cm, less than 4 cm, or other suitable length. Width W of core 14W may be 0.6 cm, 0.3 to 1.2 cm, 0.3 to 1 cm, 0.2 to 1.5 cm, at least 0.2 cm, at least 0.3 cm, less than 1.2 cm, less than 2 cm, less than 4 cm, or other suitable width. Thickness T of core 14W may be 1 mm, 0.5 to 2 mm, less than 3 mm, less than 5 mm, more than 0.2 mm, more than 1 mm, 0.1 cm, 0.05-0.2 cm, at least 0.05, less than 0.4 cm, or other suitable thickness. Solenoid 14 may be an elongated linear (strip-shaped) solenoid and core 14C may extend along a longitudinal axis. Thickness T may extend outwardly from the rear housing wall of housing 62.

Width W may run parallel to the surface of the rear housing wall of housing 62. With one illustrative configuration, width W is at least 4 times more than thickness T and length L is at least 4 times width W. Other configurations may be used for solenoid 14, if desired. The longitudinal axis of solenoid 14 may extend parallel to the opposing left and right sidewalls of housing 62 to which strap 60 is coupled.

Wire 14W may be formed from solid copper wire or other suitable conductive strands of material. There may be 2-100, more than 10, more than 40, more than 120, less than 300, less than 150, less than 75, or other suitable number of turns of wire 14W wrapped around core 14C (longitudinal axis 70). The diameter of wire 14W may be 0.1 mm, 0.05-0.2 mm, more than 0.03 mm, more than 0.08 mm, less than 0.3 mm, less than 1 mm, or other suitable diameter.

Figure 6:
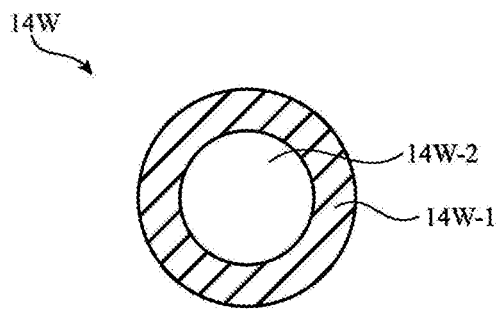
FIGS. 6, 7, and 8 are cross-sectional side views of illustrative conductive strands of material that may be used in forming wireless power transmitting and wireless power receiving solenoids in accordance with an embodiment.
Figure 7:
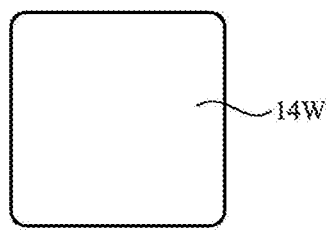
Figure 8:
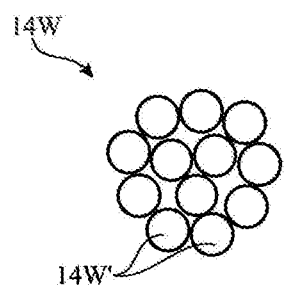

FIG. 6 shows how wire 14W may have solid cores such as core 14W-1 coated with one or more coating layers such as layer 14W-2. In general, wire 14W may have one or more, two or more, three or more, or four or more layers including core 14W-1 and these layers may be dielectrics and/or conductors. As one example, core 14W-1 may be copper and coating 14W-2 may be a magnetic material such as iron. As another example, core 14W-1 may be a metal such as copper and coating 14W-2 may be a polymer coating or other dielectric coating. Configurations in which the sides of strand 14W are flat to help allow for a high density of turns around core 14W (see, e.g., strand 14W of FIG. 7, which has a rectangular cross-sectional shape) and in which multiple smaller strands 14W' are intertwined to form strand 14W (as shown in FIG. 8) may also be used.

Figure 9:
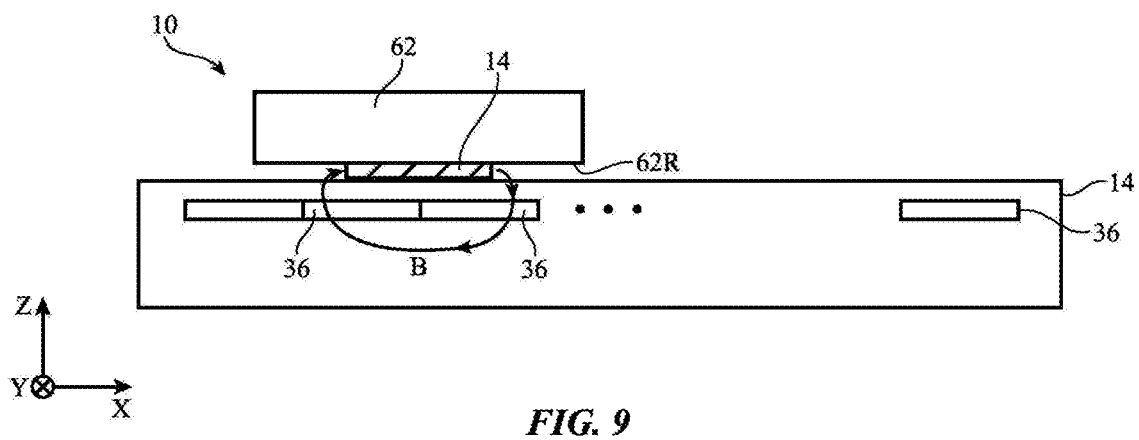
FIG. 9 is a cross-sectional side view of an illustrative wireless power receiving device resting horizontally on a wireless charging surface of an illustrative wireless power transmitting device with an array of wireless power transmitting coils in accordance with an embodiment.

In some situations, a user may place housing 62 on a charging surface so that the front or rear face of housing 62 lies flat on the charging surface. As shown in FIG. 9, for example, housing 62 may be placed so that the front and rear faces of housing 62 each lie in a plane parallel to the charging surface of device 12 (parallel to the X-Y plane). In this configuration, magnetic field B from coil(s) 36 may pass laterally (horizontally in the configuration of FIG. 9) through solenoid 14.

Figure 10:
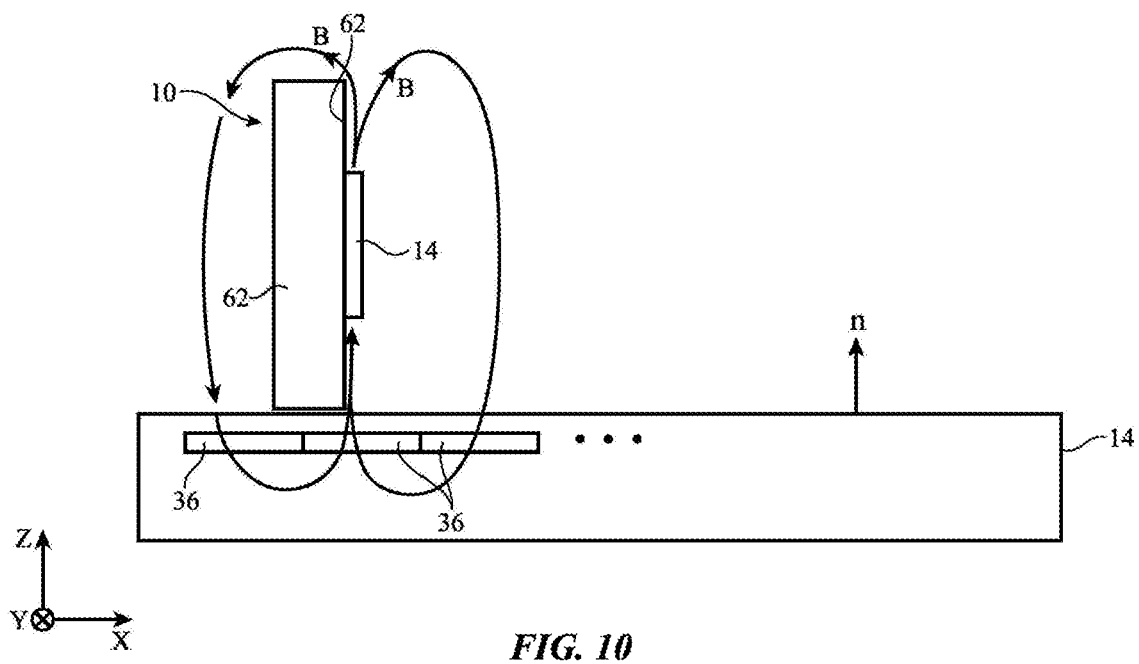
FIG. 10 is a cross-sectional side view of an illustrative wireless power receiving device resting vertically on a wireless charging surface of the illustrative wireless power transmitting device of FIG. 9 in accordance with an embodiment.

In some scenarios, a user may place housing 62 on its side on a wireless charging surface, as shown in FIG. 10. For example, when a user removes a watch, the user may place the watch on a charging surface so that the sidewalls of housing 62 that are most adjacent to wrist strap 60 (the vertically extending sidewalls of housing 62 in the example of FIG. 10) are oriented parallel to surface normal n of the charging surface of wireless device 12 (along the vertical Z axis). Strap 60 may extend parallel to the charging surface and may be perpendicular to surface normal n. In some situations, for example, if band 60 is an elastomeric loop and has no clasps, it may be impossible for a user to place the rear face of housing 62 on the charging surface and the most likely orientation for device 10 may therefore be the orientation shown in FIG. 10. In this orientation in which device housing 62 is resting on a housing edge, magnetic field B from coil(s) 36 may pass vertically through solenoid 14 (along axis Z of FIG. 10).

The use of a rear-mounted solenoid such as solenoid 14 in the examples of FIGS. 9 and 10 allows device 10 to receive satisfactory wireless power in both horizontal (parallel) and vertical (perpendicular) orientations of solenoid 14 (longitudinal axis 70) relative to the coil array formed under the charging surface of device 12. The coupling efficiency between devices 12 and 10 in the scenarios of FIGS. 9 and 10 may be, for example, between 5% and 25%, above 4%, below 30%, or other suitable values. Coils 36 may have any suitable shape and size. For example, coils 36 may be hexagonally tiled coils in three staggered layers (as described in connection with FIG. 3) and may have coil diameters of 1-10 cm, 2-5 cm, 2-4 cm, 2-3 cm, more than 0.5 cm, less than 15 cm, or other suitable coil diameter values.

Figure 11:
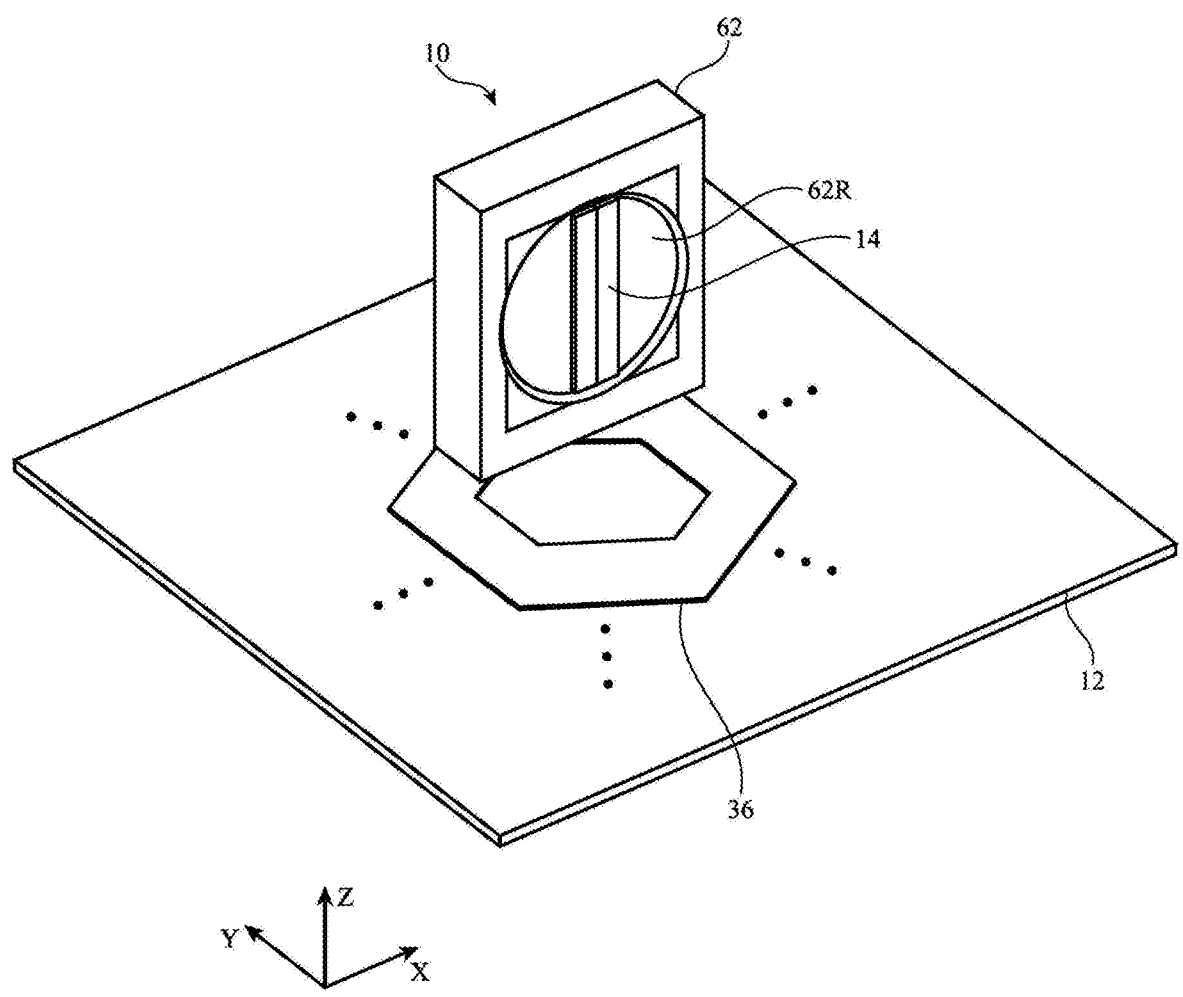
FIG. 11 is a perspective view of an illustrative wireless power receiving device receiving wireless power signals from a wireless power transmitting device having an array of coils in accordance with an embodiment.

FIG. 11 is a perspective view of device 10 in an illustrative configuration in which solenoid 14 is oriented perpendicular to the surface (X-Y plane) of device 12. As shown in FIG. 11, solenoid 14 may have an elongated shape (e.g., an elongated strip shape) that extends across some or all of rear wall 62R of housing 62. Configurations in which solenoid 14 is mounted elsewhere in watch housing 62 may also be used.

Figure 12:
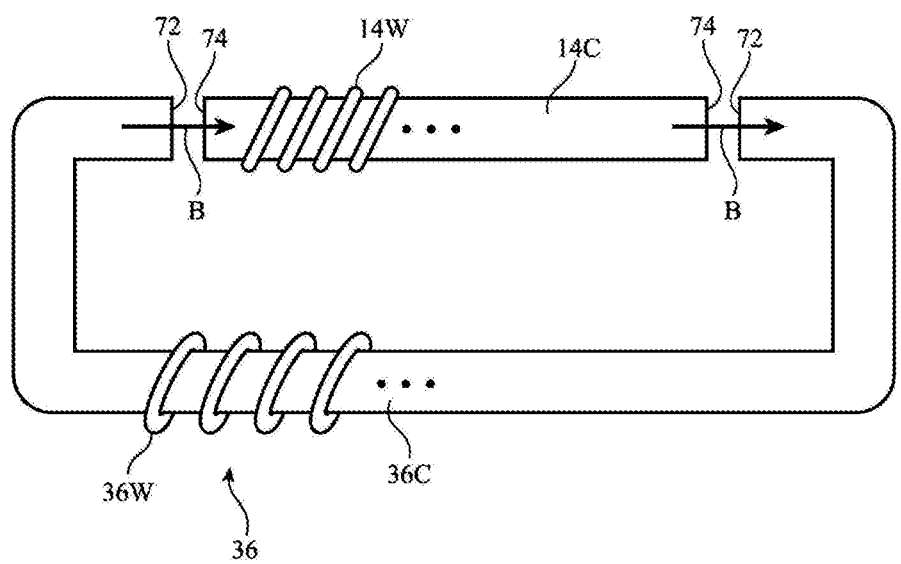
FIG. 12 is a cross-sectional side view of an illustrative linear wireless power receiving solenoid having first and second ends that are receiving wireless power signals from respective first and second ends of an illustrative C-shaped wireless power transmitting solenoid in accordance with an embodiment.

It may be desirable to place solenoid 14 within a charging cradle in device 12 during charging. A cradle in device 12 may, for example, have a single wireless power transmitting coil such as illustrative C-shaped solenoid 36 of FIG. 12. As shown in FIG. 12, solenoid 36 may, in this illustrative configuration, have multiple turns of wire 36W (e.g., wire such as wire 14W of solenoid 14) wrapped around magnetic core 36C (see, e.g., the materials and structures used in forming core 14C of solenoid 14). This type of arrangement for wireless power transmitting solenoid 36 may be used in a wireless charging puck, in a stand, in a puck or other device that is tethered to the end of a cable, or other wireless power transmitting device 12. As shown in FIG. 12, the C shape of core 36C allows the ends of wireless power transmitting solenoid 36 (e.g., ends 72 of core 36C) to be placed adjacent to ends 74 of core 14W (e.g., the opposing ends of solenoid 14), thereby enhancing the efficiency with which magnetic field B from C-shaped solenoid 36 is coupled into solenoid 14.

Figure 13:
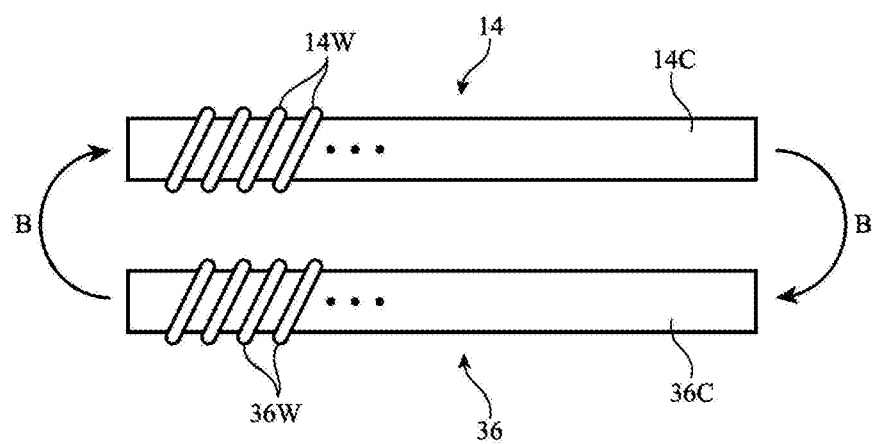
FIG. 13 is a cross-sectional side view of an illustrative linear wireless power receiving solenoid and an illustrative linear wireless power transmitting solenoid located so that first and second ends of the wireless power receiving solenoids are adjacent to respective first and second ends of the wireless power transmitting solenoid in accordance with an embodiment.

If desired, solenoid 36 may be formed from a linear solenoid core and solenoid 14 may be formed from a linear solenoid core, as shown in FIG. 13. In arrangements of this type in which solenoids 36 and 14 are elongated linear solenoids, the opposing ends of power transmitting solenoid 36 may be placed adjacent to corresponding ends of power receiving solenoid 14 to enhance power transfer efficiency. Solenoids 36 of FIG. 13 may be mounted in a support structure such as a cradle in device 12. Solenoid 14 of FIG. 13 may be mounted on housing 62 at the rear face of device 10.

Figure 14:
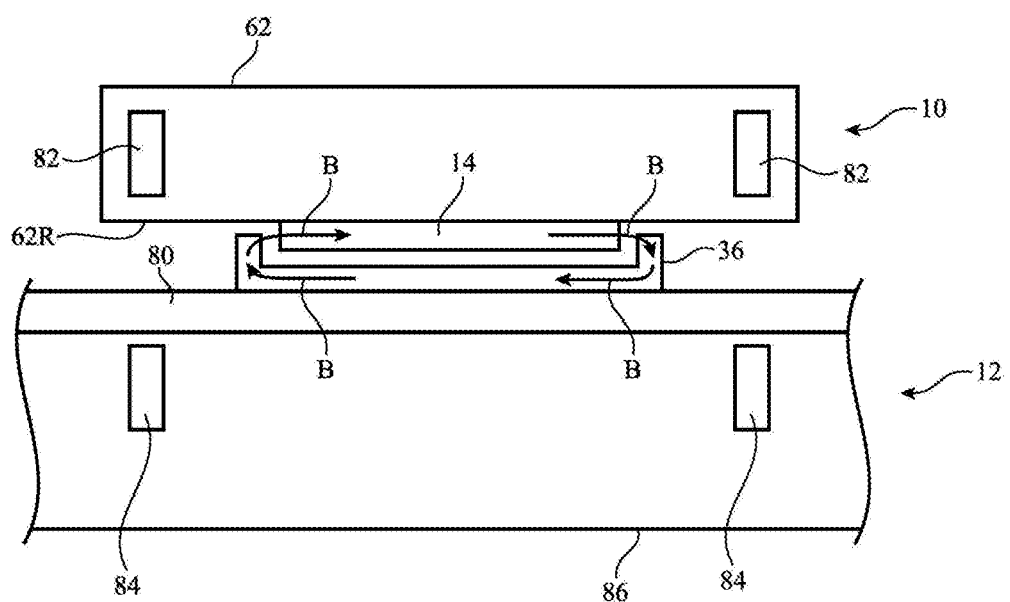
FIG. 14 is a cross-sectional side view of an illustrative system with a linear wireless power receiving solenoid and a U-shaped power transmitting solenoid in accordance with an embodiment.

FIG. 14 is a cross-sectional side view of system 8 in an illustrative configuration in which wireless power transmitting device 12 has a U-shaped wireless power transmitting solenoid 36. Wireless power receiving solenoid 14 may be a linear solenoid that is received within a cavity formed between the opposing ends of U-shaped power transmitting solenoid 36. As with the solenoid wireless power transmitting configurations of FIGS. 12 and 13, power may be transmitted wirelessly when solenoid 14 is receiving within a cradle recess or other support structure cavity so that the ends of the wireless power transmitting solenoid are adjacent to the corresponding ends of the wireless power receiving solenoid. Magnets 82 and 84 (and/or iron bars or other magnetic members) may be used to help temporarily hold device 10 against device 12 (e.g., while solenoid 14 is in the cradle formed from U-shaped solenoid 36 or a cradle with a wireless power transmitting solenoid of other suitable shapes). If desired, a shielding layer such as shielding layer 80 may be formed under solenoid 36. Layer 80 may be, for example, a layer of copper or other metal. The solenoid-based coils 36 for device 12 that are shown in FIGS. 12, 13, and 14 may be incorporated into a cradle that receives solenoid 14 in a puck or other structure tethered to the end of a cable, into a cradle that receives solenoid 14 in a stand, or in other equipment configured to receive solenoid 14 on rear housing wall 62R of housing 62.

Solenoid 14 may be incorporated into device 10 in a position in which solenoid 14 is proud of the outermost surface of rear housing wall 62R. For example, dielectric material 62D (polymer, ceramic, glass, etc.) may be used to hold solenoid 14 in a position of the type shown in FIG. 15 in which solenoid 14 is spaced apart from planar rear surface 62R of housing 62 of device 10. FIG. 16 is a cross-sectional side view of device 10 in a configuration in which solenoid 14 has been mounted flush with the outer surface of housing 62. As shown in FIG. 16, inner surface 14' of solenoid 14, which faces housing 62, may be flush with the outwardly facing (external) surface 62R of the planar rear housing wall of housing 62.

Figure 17:
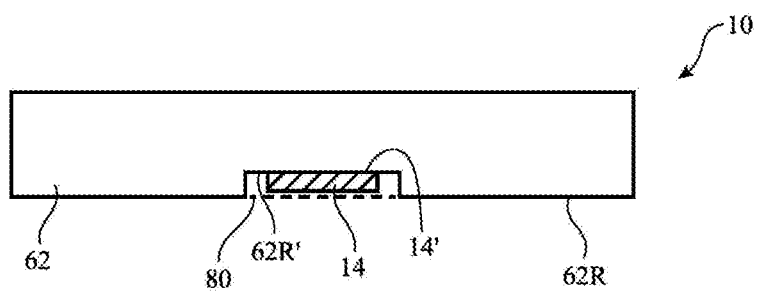

FIG. 17 shows how a portion such as region 62R' of rear housing surface 62R may be recessed below the rest of rear surface 62R. Inner solenoid surface 14' may be flush with recessed surface 62R and may therefore cause inner surface 14' to be recessed with respect to planar portions of some or all of rear surface 62R. Recessing solenoid 14 as shown in FIG. 17 may help enhance the aesthetics of device 10. Recesses (e.g., notches) may be formed in housing 62 so that housing 62 does not hinder magnetic field coupling with solenoid 14. If desired, solenoid 14 may be mounted on or adjacent to the interior surface of rear housing wall 62R (e.g., when all of wall 62R or a window in wall 62R are formed from plastic, glass, sapphire or other crystalline materials, or other dielectric materials). As when mounted in configurations on the outer surface of wall 62R, solenoid 14 may extend across the rear face of device 10 (e.g., solenoid 14 may be a strip-shaped solenoid that lies in a plane parallel to the exterior surface of rear housing wall 62R).

Figure 15:
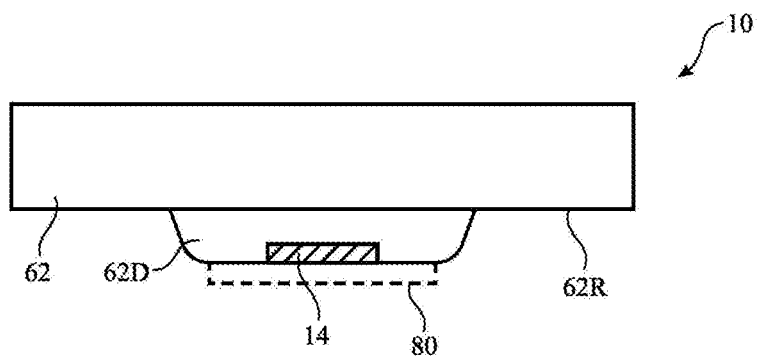
FIGS. 15, 16, and 17 are cross-sectional side views of an illustrative power receiving device having solenoids mounted respectively in positions that are proud of a rear housing surface, flush with a rear housing surface, and recessed with respect to at least some portions of a rear housing surface in accordance with an embodiment.
Figure 16:
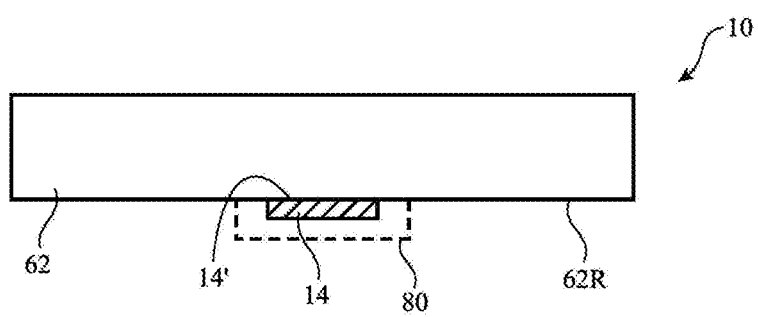

As shown in FIGS. 15, 16, and 17, dielectric 80 may cover some or all of solenoid 14 (e.g., dielectric material that forms a rear housing wall and/or a filler or coating such as a layer of plastic, glass, ceramic, etc. may that cover solenoid 14.) to provide environmental sealing and to enhance the appearance of device 10. Dielectric 80, which may be considered to form a portion of housing 62, may be configured to allow solenoid 14 to be received within a charging cradle having a solenoid of the type shown in FIG. 12, 13, or 14, or other suitable wireless power transmitting solenoid 36.

Figure 19:
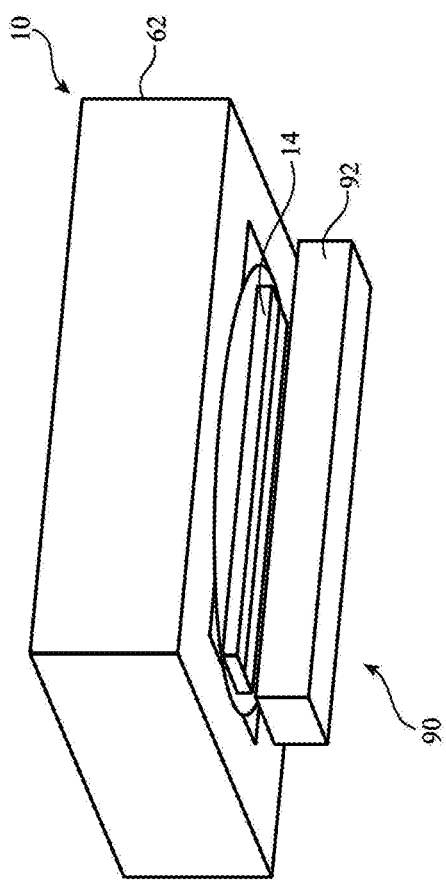
FIG. 19 is a perspective view of the illustrative cradle of FIG. 18 being mated with a wireless power receiving solenoid on a watch housing in accordance with an embodiment.
Figure 18:
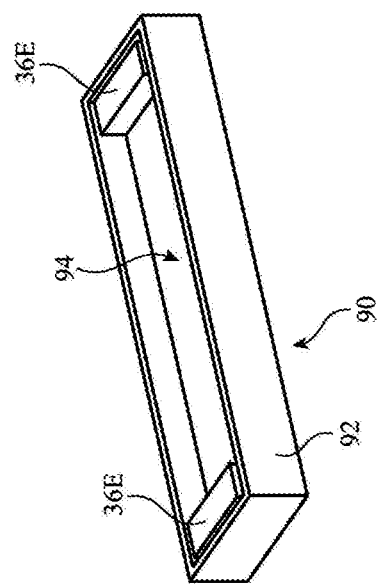
FIG. 18 is a perspective view of an illustrative cradle for a wireless power transmitting device with a wireless power transmitting solenoid in accordance with an embodiment.

As shown in FIG. 18, solenoid 36 may be mounted in cradle 90 in device 12. Cradle 90 may have support structure 92 such as a copper cradle structure, other metal cradle structures, or other support structures. Solenoid 36 may be a linear solenoid, a U-shaped solenoid, a C-shaped solenoid, or may have other suitable solenoid configurations. Support structure 92 may form part of a puck, stand, charging mat, or other wireless power transmitting device 12. In the example of FIG. 18, solenoid 36 has been configured so that solenoid end portions 36E lie on opposing ends of cavity (recess) 94 (e.g., solenoid 36 of FIG. 18 has a U-shape or a C-shape). Cavity 94 has been configured to receive solenoid 14 of device 10, as shown by in the perspective view of device 10 and cradle 90 of FIG. 19.

Figure 21:
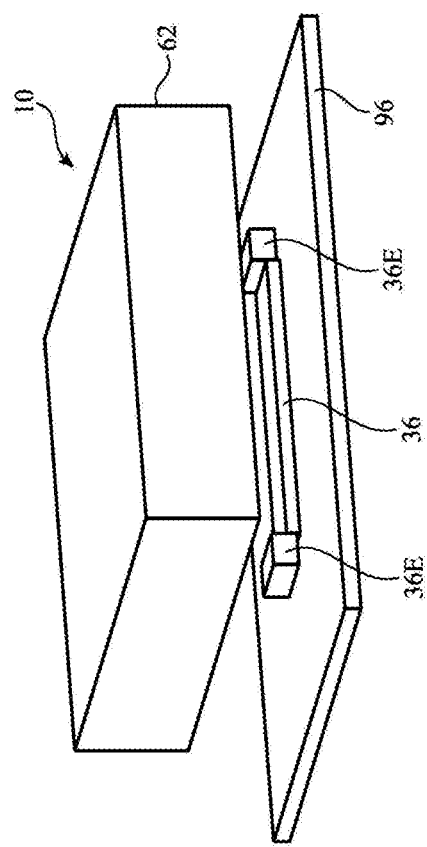
FIGS. 20 and 21 are perspective views of illustrative wireless power transmitting devices being coupled to a wireless power receiving solenoid on a watch in accordance with an embodiment.
Figure 20:
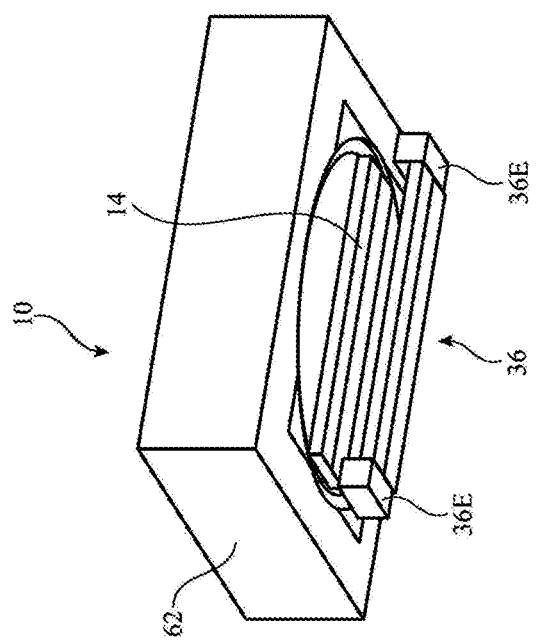

If desired, a shield layer may be formed in device 12. As shown in FIGS. 20 and 21, for example, solenoid 36 may have opposing ends 36E that are configured to mate with corresponding ends of solenoid 14. When mounted in device 12 (FIG. 21), shield layer 96 may lie under solenoid 36. Shield layer 96 may be formed from a copper plate or a layer of other shielding material (e.g., other metals, etc.). The presence of a metal shield under solenoid 36 (e.g., under a cradle or other structure supporting solenoid 36, etc.) may help improve coupling between solenoids 14 and 36 and may help improve power transfer efficiency.

Figure 22:
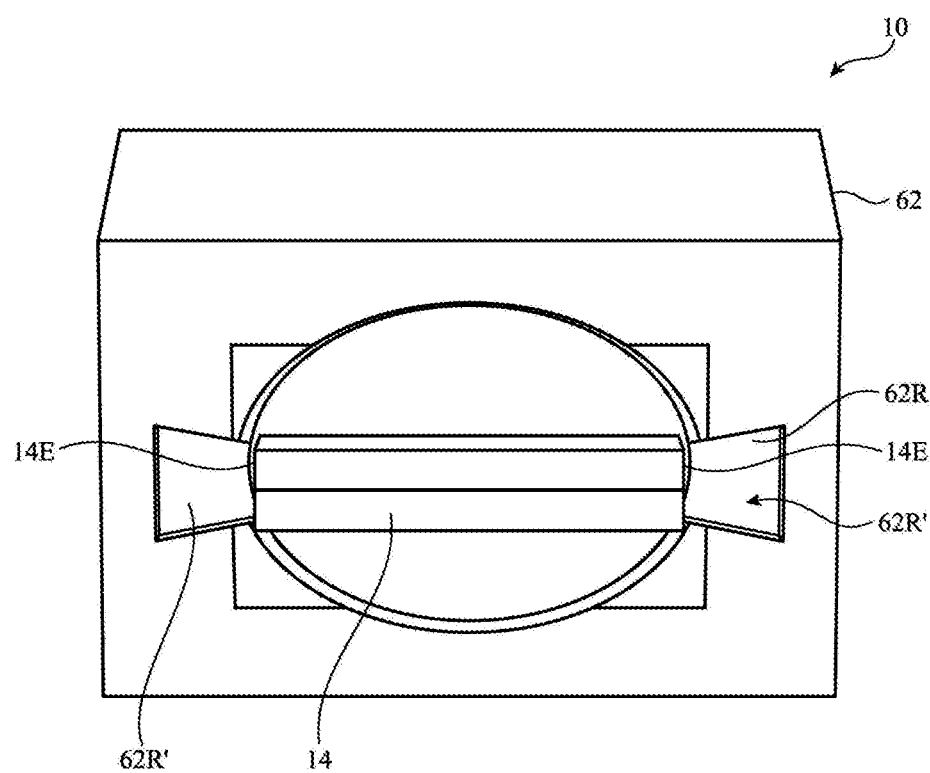
FIG. 22 is a rear perspective view of an illustrative watch housing having rear housing wall recesses adjacent to opposing ends of an elongated strip-shaped (linear) wireless power receiving solenoid on the rear face of the watch housing to enhance wireless power transfer performance in accordance with an embodiment.

FIG. 22 shows how recessed portions 62R' may be formed in rear housing wall 62R (e.g., in planar portions of wall 62R that cover some or all of the rear face of device 10). Recesses in housing 62 such as recessed portions 62R' in rear housing wall 62R may be formed adjacent to the opposing ends 14E of elongated solenoid 14. This enhances the ability of magnetic fields to couple into ends 14E and thereby enhances coupling and charging (power transfer) efficiency.

Figure 32:
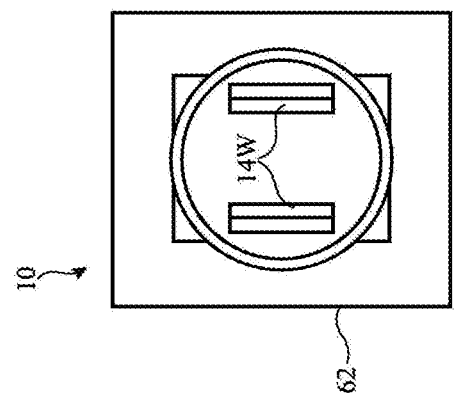
Figure 31:
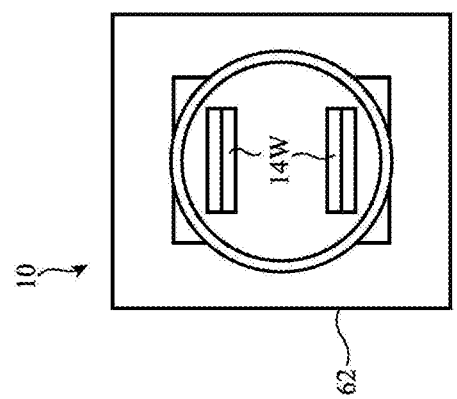

Additional illustrative configurations for solenoid 14 are shown in FIGS. 23, 24, 25, 26, 27, 28, 29, and 30. In these illustrative configurations, first and second sets of turns of wire 14W are formed on first and second respective portions of core 14C. This creates first and second solenoid portions for solenoid 14, which can be operated together (e.g., in series) or independently (e.g., by switching a solenoid portion having a higher coupling efficiency into use while switching a solenoid portion with lower coupling efficiency out of use, etc.). Solenoid 24 may curved along at least part of its length while being strip-shaped (length at least 5-20 times thickness, width at least 3-10 times width, etc.) while extending across the rear face of device 10 parallel to the surface of rear wall of housing 62. Core 14C may be curved along its length while remaining in a plane parallel to the plane of the rear face of device 10 and may, if desired, have both straight and curved segments. Solenoid 14 may extend across the rear face of device 10 on the inside or outside of rear housing wall 62R and may, if desired, be flush with surface 62R, proud of surface 62R, or on a recessed portion of surface 62R. The portion of core 14C that is wrapped with windings 14W may be straight or may, as shown in FIG. 30, by curved. If desired, cores 14C may reside primarily or exclusively within wire 14W (see, e.g., the arrangements of FIGS. 31 and 32). In this type of configuration, cores 14C may reside within wires 14W without protruding from within wires 14W or may protrude slightly from within wires 14W. The solenoids formed using this type of core and winding arrangement may, if desired, be straight and may be oriented vertically or horizontally (e.g., parallel to strap 60 of FIG. 4 or orthogonal to strap 60). Other configurations may be used for solenoid 14 if desired. The arrangements of FIGS. 23, 24, 25, 26, 27, 28, and 29 are illustrative.

The foregoing is merely illustrative and various modifications can be made to the described embodiments. The foregoing embodiments may be implemented individually or in any combination.

What is claimed is:

1. A wireless power receiving device having opposing front and rear faces, wherein the wireless power receiving device is configured to receive wireless power signals from a wireless power transmitting device, the wireless power receiving device comprising:
   a housing having a rear housing wall at the rear face;
   a display mounted in the housing at the front face; and
   a power receiving solenoid that has a solenoid core and that is configured to receive the wireless power signals from the wireless power transmitting device, wherein the solenoid core has a first segment extending along a first longitudinal axis, a second segment extending along a second longitudinal axis parallel to the first longitudinal axis, and a curved segment that extends from and end of the first segment to an end of the second segment, wherein the power receiving solenoid comprises first windings of wire wrapped around the first segment and second windings of wire wrapped around the second segment, and wherein the second windings of wire are oriented parallel to the first windings of wire.

2. The wireless power receiving device of claim 1, wherein the curved portion runs along the rear housing wall.

3. The wireless power receiving device of claim 1, wherein the solenoid core comprises ferrite.

4. The wireless power receiving device defined in claim 1, wherein the housing is configured to receive a wrist strap.

5. The wireless power receiving device defined in claim 1, wherein at least some of the curved segment of the solenoid core is free from windings of wire.

6. The wireless power receiving device defined in claim 1, wherein the first windings of wire comprise a conductive wire selected from the group consisting of: a metal strand with a dielectric coating, a metal strand with a magnetic coating, a metal strand with a rectangular cross-sectional shape, and a conductive wire formed from multiple intertwined metal strands.

7. The wireless power receiving device defined in claim 1, further comprising:
 a battery; and
 wireless power receiving circuitry coupled to the first and second windings of wire and configured to charge the battery using the wireless power signals received by the power receiving solenoid.

8. A wireless power receiving device having opposing front and rear faces, wherein the wireless power receiving device is configured to receive wireless power signals from a wireless power transmitting device, the wireless power receiving device comprising:
 a housing having a rear housing wall at the rear face;
 a display mounted in the housing at the front face; and
 a power receiving solenoid that extends at least partially along the rear housing wall, that has a solenoid core, and that is configured to receive the wireless power signals from the wireless power transmitting device, wherein the solenoid core comprises first, second, third, and fourth segments, wherein the power receiving solenoid comprises first windings of wire wrapped around the first segment of the solenoid core and second windings of wire wrapped around the second segment of the solenoid core, wherein the third and fourth segments of the solenoid core are curved and free from windings of wire, wherein the third segment of the solenoid core extends from a first end of the first segment of the solenoid core, and wherein the fourth segment of the solenoid core extends from a second end of the first segment of the solenoid core.

9. The wireless power receiving device of claim 8, wherein the first, third, and fourth segments of the solenoid core lie within a common plane and run along the rear housing wall.

10. The wireless power receiving device of claim 9, wherein the third segment of the solenoid core has a first end at the first end of the first segment of the solenoid core and wherein the second segment of the solenoid core extends from a second end of the third segment of the solenoid core.

11. The wireless power receiving device of claim 9, wherein the wireless power receiving device comprises a wrist watch.

12. The wireless power receiving device of claim 9, wherein the solenoid core comprises a magnetic material.

13. The wireless power receiving device of claim 12, wherein the magnetic material comprises ferrite.

14. The wireless power receiving device of claim 8, wherein the first windings of wire are oriented parallel to the second windings of wire.

15. The wireless power receiving device of claim 8, wherein the solenoid core comprises a single piece of ferrite that includes the first, second, third, and fourth segments.

16. The wireless power receiving device of claim 15, wherein the third segment is elongated, has a first non-zero length, and is curved along an entirety of the first non-zero length.

17. The wireless power receiving device of claim 16, wherein the fourth segment is elongated, has a second non-zero length, and is curved along an entirety of the second non-zero length.

18. The wireless power receiving device of claim 8, wherein the third segment is elongated, has a first non-zero length, and is curved along an entirety of the first non-zero length, and wherein the fourth segment is elongated, has a second non-zero length, and is curved along an entirety of the second non-zero length.

19. The wireless power receiving device of claim 1, wherein the curved segment is elongated, has a non-zero length, and is curved along an entirety of the non-zero length.

20. The wireless power receiving device of claim 1, wherein the solenoid core comprises a single piece of ferrite that includes the first segment, the second segment, and the curved segment.

* * * * *